Sept. 2, 1952  D. T. MOWBRAY  2,609,000
ANTISKID FOOT OPERATED BELLOWS
Filed Dec. 21, 1949
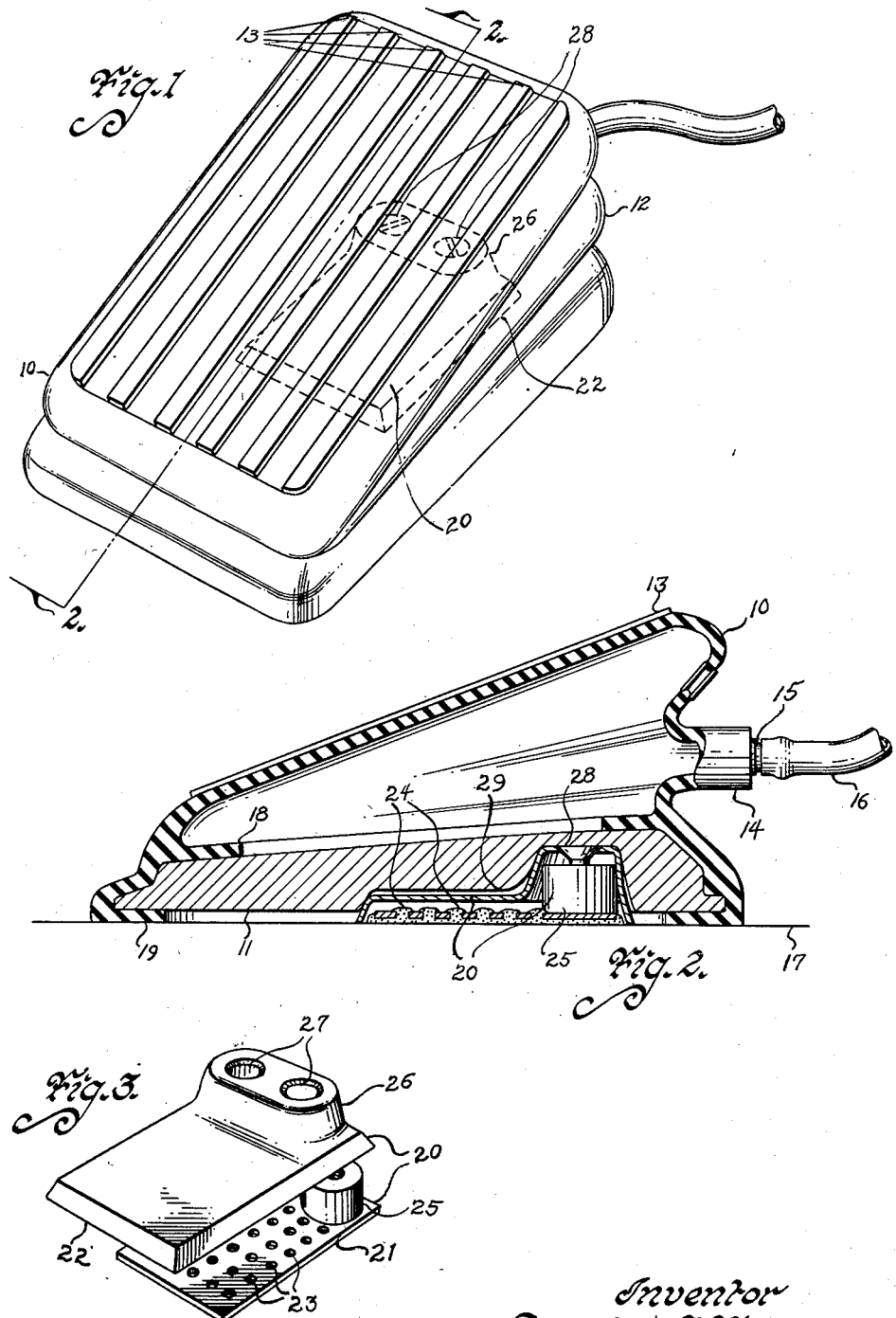
Inventor
Douglas T. Mowbray
by M. Talbert Dick
Attorney
Witness
Edward P. Seeley Patented Sept. 2, 1952

2,609,000

UNITED STATES PATENT OFFICE 2,609,000

ANTISKID FOOT OPERATED BELLOWS

Douglas T. Mowbray, Waterloo, Iowa

Application December 21, 1949, Serial No. 134,169

4 Claims. (Cl. 137—777)

The primary object of my invention is to provide an anti-skid foot operated bellows that is prevented from moving over the surface of the floor during operation.

A further object of my invention is to provide such an anti-skid bellows that may be easily lifted above and moved away from the anchoring device to allow the floor under the bellows to be cleaned.

Another object of my invention is to provide a bellows the bottom of which is formed by a separate weighting means.

A further object of my invention is to provide a bellows fitting over an anchoring means which is secured to a floor; said bellows having a resilient lip seal at its base to prevent noises resulting from the contact between the weighting means and the floor anchor.

A still further object of my invention is to provide a foot operated bellows that is durable in use, economical in manufacture and refined in appearance.

These and other objects will be apparent to those skilled in the art.

My invention consists in the construction, arrangement, and combination of the various parts of the device, whereby the objects contemplated are attained as hereinafter more fully set forth, pointed out in my claims, and illustrated in the accompanying drawings, in which:

Fig. 1 is a perspective view of my device, with dotted lines showing its anchor means.

Fig. 2 is a cross-section of my device taken on the line 2—2 of Fig. 1.

Fig. 3 is an exploded perspective view of the anchoring means.

Foot operated bellows designed to rest on a floor or like are old. The chief difficulty, however, of such air induced pumps is that they slide out of proper position on the floor or like surface either by accident or due to side pressures experienced by the item during its operation. If the bellows is secured to the floor surface, it can not well be quickly removed for floor cleaning or like. Furthermore, many floors of tile, cement, or like do not lend themselves to bolt, or screw fastening means. I have overcome such objections by providing a bellows of novel design and one capable of being readily detached from its anchor means.

Referring to the drawings, 10 designates the main body portion of the bellows which is made of some resilient material such as rubber or the like and has its top and sides formed in a single piece. This method of manufacture is possible, because the bottom is a separate bottom-weight 11 that is inserted later. The base of the bellows is approximately rectangular in shape, and the top slants upwardly and forwardly. The sides 12 are formed like accordion pleats to predetermine the direction of movements of the sides as the bellows is collapsed. There are corrugations 13 on the slanting top surface to prevent a foot or the like from slipping from the device when pressure is applied. In the rear end of the bellows is a neck portion 14 which embraces a fitting 15 for connecting a flexible conduit 16 to the bellows for conducting the air pressure generated by collapsing the bellows to the point of use.

In Fig. 2 the numeral 17 designates a floor surface or the like. The weight-bottom member 11 is detachably embraced at its edges by the bellows 10 by stop flange 18 above by the sealing flange 19, below. Flange 19 is interposed between the weight-bottom 11 and the floor 17 as shown in Fig. 2.

Fig. 3 shows the anchor 20 comprising a base portion 21 which may be secured to a floor surface or like by an adhesive and a top portion 22 that is secured to the base portion 21. Base portion 21 has perforations 23 in it which permit the adhesive to flow through and over part of the top of it which produces a series of rivet-like projections 24 through said plate, as shown in Fig. 2. Nuts 25 are secured to one end of base portion 21 by any suitable means. Top portion 22 as shown in Fig. 3 takes the form of a hollow truncated pyramid of rectangular base with a raised portion 26 at one end to accommodate nuts 25. There are two holes 27 in the raised portion 26 to permit screws 28 to extend downwardly through top portion 22 and thread into nuts 25, thus securing the two parts of anchor 20 together. Base portion 21 of anchor 20 may be eliminated if the bellows is to be used on a wood floor or like. On such a floor, top portion 22 of anchor 20 is secured to the floor surface by means of wood screws or the like. Weight-bottom member 11 has an inverted well 29 in its underside designed to embrace anchor 20 when bellows 10 is resting on floor surface 17, as shown in Fig. 2. The sides and ends of well 29 are slanted to contact anchor top portion 22 only when the bellows is resting on the floor surface 17 or like, as shown in Fig. 2. Thus the bellows is self-centering as it is placed over anchor 20. Inversely the initial lifting force applied to bellows 10 frees well 29 from anchor 20 so that the bellows 10 may be readily moved to permit the floor surface to be cleaned.

In operation, anchor base portion 21 is secured to the floor by any suitable means. Anchor top portion 22 is secured thereto by screws 28.

The bellows 10 is placed over the anchor so that well 29 in the bottom-weight 11 fits over the anchor. In this operating position flange 19 of bellows 10 is slightly compressed against the floor 17 to act as a seal against noise.

The operator places a foot against the top of the bellows and applies pressure compressing the bellows and expelling the air contained therein. The force required to collapse the bellows tends to force the bellows 10 over the surface of the floor 17. With the bellows mounted over the anchor 20, however, no movement over the surface of the floor 17 can take place.

Some changes may be made in the construction and arrangement of my anti-skid foot operated bellows without departing from the real spirit and purpose of my invention, and it is my intention to cover by my claims, any modified forms of structure or use of mechanical equivalents which may be reasonably included within their scope.

I claim:

1. In a device of the class described, a resilient bellows having a bottom and two spaced apart inwardly extending continuous flanges formed near the bottom of said bellows, and a weight means detachably resting between said flanges.

2. In a device of the class described, a resilient bellows open at its bottom and having two spaced apart inwardly extending continuous flanges formed on the inside bottom of said bellows, and a weight plate member having its peripheral edge portion detachably resting in the space between said two flanges and closing the open bottom of said bellows to render said bellows bottom substantially air tight.

3. In a device of the class described, a resilient bellows open at its bottom and having two spaced apart inwardly extending continuous flanges formed on the inside near the bottom of said bellows, a weight plate member having its peripheral edge portion resting in the space between the two flanges of said bellows and closing the open bottom of said bellows; said weight plate having a depression in the bottom thereof, and an anchor member detachably extending into said depression and designed to be permanently secured to a horizontal surface.

4. In a device of the class described, a resilient bellows open at its bottom and having two spaced apart inwardly extending continuous flanges formed on the inside and near the bottom of said bellows, a weight plate member having its peripheral edge portion resting in the space between the two flanges of said bellows and closing the open bottom of said bellows; said weight plate having a depression therein with upwardly and inwardly sloping sides, an anchor member having upwardly and inwardly sloping sides detachably extending into said depression and designed to be fixed to a horizontal surface.

DOUGLAS T. MOWBRAY.

REFERENCES CITED

The following references are of record in the file of this patent:

UNITED STATES PATENTS

| Number | Name | Date |
|---|---|---|
| 433,426 | Tucker | July 29, 1890 |
| 1,384,314 | Fulton | July 12, 1921 |
| 1,454,207 | Bemis | May 8, 1923 |
| 1,521,985 | Bastin | Jan. 6, 1925 |
| 1,558,439 | Schilplin | Oct. 20, 1925 |
| 1,579,183 | Weiland | Mar. 30, 1926 |
| 1,652,029 | Lucarelle | Dec. 6, 1927 |
| 1,915,559 | Thompson | June 27, 1933 |
| 2,002,798 | Renholdt | May 28, 1935 |
| 2,063,043 | McKesson | Dec. 8, 1936 |
| 2,341,556 | Joy | Feb. 15, 1944 |